July 25, 1950          G. NEMETZ          2,516,244
PRESSURE LUBRICATING SYSTEM
Filed Jan. 4, 1941
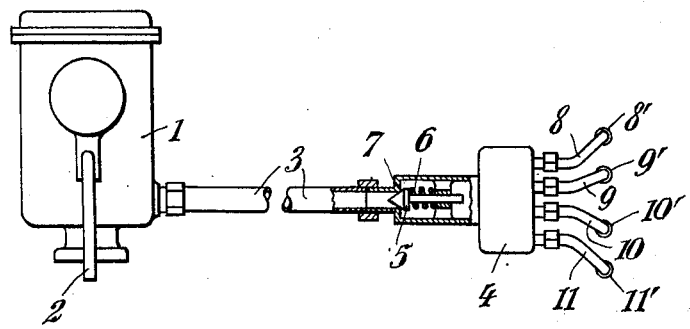
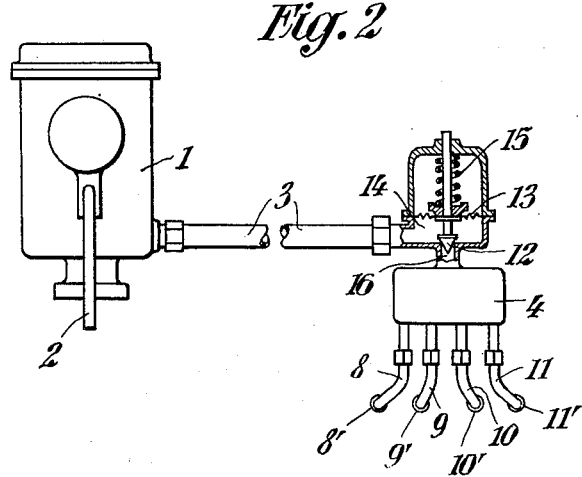
INVENTOR
GUSTAV NEMETZ
BY Karl A. Mayr
ATTORNEY.

UNITED STATES PATENT OFFICE 2,516,244

PRESSURE LUBRICATING SYSTEM

Gustav Nemetz, Vienna, Germany; vested in the Attorney General of the United States Application January 4, 1941, Serial No. 373,101
In Germany December 15, 1939

4 Claims. (Cl. 184—7)

The present invention relates to pressure lubricating systems in which the lubricant supplied by a source of pressure is distributed by means of a divisional feeder to a plurality of points of lubrication all of which are under an equal pressure. Divisional feeders as disclosed in U. S. Patents No. 2,027,171 or No. 2,007,797 may be used in connection with the systems according to the invention. In such systems, a conduit connects the source of pressure with the divisional feeder which is located in proximity to the points of lubrication in order to reduce the length of conduits required. In each conduit leading from the divisional feeder to a point of lubrication, preferably directly at the latter, a non-return device is usually inserted, preferably a check valve opening toward the point of lubrication. The purpose of said devices is to protect the conduits against the pressure prevailing at the points of lubrication. In a lubricating system of this kind having e. g. four points of lubrication it is, therefore, necessary to provide four check valves whereby the initial outlay and the cost of maintenance for the system are increased.

The object of the present invention is to simplify and reduce the cost of lubricating systems of this kind and, above all, to avoid supervision of numerous non-return devices without impairing the safety of operation.

The accompanying drawing shows in Figs. 1 and 2 by way of example diagrammatic views partly in section of embodiments of the invention.

In the system according to Fig. 1 the lubricant is supplied by a pump 1 of the usual kind which is operated in a known manner by a suitable source of power by means of an oscillating lever 2. A conduit 3 connects the pump 1 with a divisional feeder 4 the construction of which, as mentioned above, corresponds, for example, to that disclosed in U. S. Patent No. 2,027,171 or No. 2,007,797, so that a detailed description may be dispensed with. In the conduit 3 immediately before the divisional feeder 4 is arranged a non-return device which is adapted to open in the direction of the divisional feeder, thus allowing the lubricant supplied by the source of pressure to pass whereas it seals the passage toward the source of pressure. In the example shown in Fig. 1, the non-return device consists of a back-pressure valve of a design known per se, the valve cone 5 of which is pressed against its seat 7 by the power of a helical spring 6. Conduits 8, 9, 10, 11 lead from the divisional feeder to the points of lubrication 8', 9', 10', 11' at which, at any given moment, the same pressure prevails.

During operation, the conduit 3 is always completely filled with lubricant. The amount of lubricant supplied by the pump enters the divisional feeder 4 after passing the check valve. The source of pressure is, therefore, positively protected by the check valve in the conduit 3 from any undesired actions of the medium originating at the points of lubrication, such as caused by compressed air or steam. Because of the uniform pressure prevailing at all points 8', 9', 10' and 11' no undesired reactions disturbing the accuracy of the lubricant distribution can occur.

In Fig. 2 is shown an embodiment of the invention comprising a diaphragm type overflow valve. Said diaphragm type overflow valve consists of a valve cone 12 fastened to a diaphragm 13. The diaphragm 13 seals the space 14 within the valve casing to which the lubricant is supplied under pressure by the pump 1. The valve cone 12 is loaded through diaphragm 13 from the outside by a spring 15 tending to keep said cone in closed position. When the lubricant is forced into the space 14 underneath the diaphragm, valve cone 12 is lifted off its seat against the action of the spring and the lubricant flows through opening 16 directly into the divisional feeder 4 by means of which it is distributed to the points of lubrications 8', 9', 10', 11' which are at the same moments under substantially the same pressure.

If, in addition, known check valves were arranged between each point of lubrication and the divisional feeder, the former would, in fact, also protect the distributing pistons of the divisional feeder from the action of the counter-pressures prevailing at the points of lubrication. This, however, is not necessary with a system according to the invention as shown in Figs. 1 or 2. The check valves can be omitted because, as is presupposed with a lubricating system to which the invention is applied, substantially the same pressure prevails at the same moments at all points of lubrication such as the points of lubrication located on the circumference of a power cylinder, and the divisional feeder may be safely exposed to the counter-pressure prevailing at the points of lubrication without the least danger to accurate and proper distribution of the lubricant. In accordance with the present invention, a single check valve suffices to assure perfect operation of the pressure lubricating system.

What I claim is:

1. A pressure lubricating system for discharging a lubricant at a plurality of different points of machinery of a type in which, at the same moment, substantially the same pressure prevails at all of said points and varies considerably at different moments, said system comprising a source of lubricant, a piston type lubricant feed divider of the type operated exclusively by the lubricant pressure and having a lubricant inlet and a plurality of lubricant outlets, a plurality of individual lubricant conduits directly, individually and unrestrictedly interconnecting said outlets and said lubricant discharge points, a main lubricant conduit interconnecting said source and said lubricant inlet, and a flow checking device in said main lubricant conduit disposed adjacent said divider and preventing flow in a direction from said divider to said source.

2. A pressure lubricating system according to claim 1 in which said device is a check valve, and in which said individual conduits are very short relatively to the length of said main lubricant conduit.

3. A pressure lubricating system according to claim 1 in which said device comprises a valve and a spring loaded diaphragm exposed to the lubricant pressure in said main lubricant conduit and connected with and normally closing said valve, said diaphragm being so adjusted as to open said valve only when the lubricant pressure in said main lubricant conduit exceeds the maximum pressure prevailing at the points at which lubricant is discharged.

4. A pressure lubricating system according to claim 1 in which said device is integral with and forms part of said divider and prevents flow therefrom into said main lubricant conduit.

GUSTAV NEMETZ.

REFERENCES CITED

The following references are of record in the file of this patent:

UNITED STATES PATENTS

| Number | Name | Date |
|---|---|---|
| 822,900 | McCanna | June 5, 1906 |
| 1,443,101 | Strauss | Jan. 23, 1923 |
| 1,623,240 | Goodrich | Apr. 5, 1927 |
| 1,901,027 | Grattan | Mar. 14, 1933 |
| 1,950,158 | Barks | Mar. 6, 1934 |
| 2,007,797 | Folke | July 9, 1935 |
| 2,027,171 | Hillis | June 7, 1936 |
| 2,062,213 | Dieny | Nov. 24, 1936 |
| 2,232,307 | Barker | Feb. 18, 1941 |